United States Patent [19]
Takano et al.

[11] Patent Number: 5,853,876
[45] Date of Patent: *Dec. 29, 1998

[54] BIODEGRADABLE ADHESIVE TAPE AND BIODEGRADABLE ADHESIVE LABEL

[75] Inventors: Akihiko Takano, Urawa; Sadakazu Morio, Kumagaya; Masao Kogure, Kitaadachi-gun; Takanori Saitoh, Misato, all of Japan

[73] Assignee: Lintec Corporation, Tokyo, Japan

[ * ] Notice: The term of this patent shall not extend beyond the expiration date of Pat. No. 5,658,646.

[21] Appl. No.: 834,234

[22] Filed: Apr. 15, 1997

Related U.S. Application Data

[63] Continuation of Ser. No. 280,318, Jul. 26, 1994, Pat. No. 5,658,646.

[30] Foreign Application Priority Data

| Jul. 28, 1993 | [JP] | Japan | 5-186472 |
| Jul. 28, 1993 | [JP] | Japan | 5-186473 |
| Jul. 28, 1993 | [JP] | Japan | 5-186474 |
| Jul. 28, 1993 | [JP] | Japan | 5-186475 |

[51] Int. Cl.$^6$ ..................................................... B32B 7/00
[52] U.S. Cl. .................. 428/352; 428/343; 428/354; 428/355 R; 428/411.1; 428/480; 428/492; 428/500; 428/515; 428/532; 428/913
[58] Field of Search ................... 428/195, 201, 428/343, 411.1, 423.9, 500, 507, 511, 514, 515, 516, 520, 913, 352, 354, 355 R, 480, 492, 532; 283/107, 101

[56] References Cited

U.S. PATENT DOCUMENTS

| 4,286,011 | 8/1981 | Wong .......................................... 428/220 |
| 4,985,024 | 1/1991 | Sipinen ....................................... 604/389 |
| 5,191,037 | 3/1993 | Doi et al. .................................... 525/450 |
| 5,384,187 | 1/1995 | Uemura et al. ........................... 428/262 |

FOREIGN PATENT DOCUMENTS

| 0609713 | 8/1994 | European Pat. Off. . |
| 4126230 | 2/1993 | Germany . |
| 4220778 | 8/1992 | Japan . |
| 9201733 | 2/1992 | WIPO . |
| 9322354 | 11/1993 | WIPO . |

*Primary Examiner*—Marie Yamnitzky
*Attorney, Agent, or Firm*—Webb Ziesenheim Bruening Logsdon Orkin & Hanson, P.C.

[57] ABSTRACT

An adhesive tape or an adhesive label each of which comprises a substrate including a biodegradable polymer layer and an adhesive layer provided on at least one surface of the substrate. The adhesive tape has a release agent layer formed on an opposite surface to the surface where the adhesive layer is provided, or has a release tape which is in contact with the adhesive layer, and the adhesive tape was wound up around a core for storage. The adhesive label has a release sheet which is in contact with the adhesive layer. In such biodegradable adhesive tape and biodegradable adhesive label, a biodegradable polymer is used as a material of the substrate, and therefore the tape and label do not disrupt the natural environment or do not largely disorganize the ecosystem in the soil even when discarded in the soil after use.

5 Claims, 10 Drawing Sheets

BIODEGRADABLE ADHESIVE TAPE AND BIODEGRADABLE ADHESIVE LABEL

This is a continuation of application Ser. No. 08/280,318 filed on Jul. 26, 1994, now U.S. Pat. No. 5,658,646.

FIELD OF THE INVENTION

The present invention relates to an adhesive tape and an adhesive label each of which comprises a substrate in the form of a tape, a film or etc. and an adhesive layer provided on said substrate. More particularly, the invention relates to a biodegradable adhesive tape and a biodegradable adhesive label each of which can be degraded by microbes when discarded in the soil so as not to exert bad influence on the natural environment.

BACKGROUND OF THE INVENTION

Adhesive tapes and adhesive labels each of which comprises a substrate in the form of a tape, a film or etc. and an adhesive layer formed on the substrate are conventionally known.

Examples of the adhesive tapes include a single-sided adhesive tape comprising a release agent layer formed on one surface of an adhesive tape substrate and an adhesive layer formed on the other surface of the substrate; and a double-sided adhesive tape comprising a double-sided adhesive tape main body which has an adhesive tape substrate bearing adhesive layers on both surfaces thereof and a double-sided release tape having a release tape substrate bearing release agent layers on both surfaces thereof, which adheres to one of the surfaces of the adhesive tape main body.

The adhesive tapes are stored or on the market as rolls formed by winding those tapes around a paper core or a plastic core. In the case of the single-sided adhesive tape, the adhesive tape itself is rolled up via its release agent layer so that the adhesive layers are not directly brought into contact with each other. In the case of the double-sided tape, the double-sided adhesive tape main body is rolled up via the release tape so that the adhesive layers are not directly brought into contact with each other.

Examples of the adhesive labels include an adhesive label which comprises an adhesive label main body having an adhesive label substrate and an adhesive layer laminated thereon and a release sheet having a paper sheet and a release agent layer provided thereon, in which the adhesive layer of the adhesive label main body is adhered to the release agent layer of the release sheet.

For the use of the adhesive label of this type, the adhesive label main body is released from the release sheet.

As the substrates of the adhesive tapes and the adhesive labels referred to the above, plastic substrates have been mainly used conventionally. For the disposal of the conventional adhesive tapes and adhesive labels after use, they are incinerated or buried in the soil.

However, such disposal involves the following problems.

(1) Problems in disposal by incinerating.

When the adhesive tapes and adhesive labels including the plastic substrate are incinerated, energy of high intensity is required for burning the plastic substrate. Further, carbon dioxide is generated by burning of the plastic substrate, and thereby warming of the earth may be accelerated. Particularly when the plastic substrate is polyvinyl chloride, a hydrogen chloride gas is generated to cause acid rain.

(2) Problems in the disposal by burying in the soil.

Recently, waste disposal by burying the waste in the soil has been markedly increased, and hence it is difficult to keep a site for the waste disposal. Further, if the adhesive tapes and the adhesive labels are buried in the soil, the plastic materials used for their substrates stably exist for a long period of time, and thereby the natural environment is disrupted or the ecosystem in the soil is disorganized.

It can be thought to separate the plastic substrates from the adhesive tapes and the adhesive labels after use to recycle them. However, the separation and the collection of the plastic substrates require an enormous cost, and this results in bad marketability. In addition, such recycled plastic substrates are deteriorated in quality.

OBJECT OF THE INVENTION

The present invention is intended to solve such problems associated with the prior art technique as described above, and it is an object of the invention to provide an adhesive tape and an adhesive label each of which does not disrupt the natural environment or does not disorganize the ecosystem in the soil even when discarded in the soil after use.

SUMMARY OF THE INVENTION

The first biodegradable adhesive tape according to the invention comprises an adhesive tape substrate including a biodegradable polymer layer, a release agent layer formed on one surface of said substrate and an adhesive layer formed on the other surface of said substrate.

The second biodegradable adhesive tape according to the invention comprises a biodegradable double-sided adhesive tape main body comprising an adhesive tape substrate including a biodegradable polymer layer and adhesive layers formed on both surfaces of the adhesive tape substrate; and a double-sided release tape comprising a release tape substrate and release agent layers formed on both surfaces of the release tape substrate, wherein the biodegradable double-sided adhesive tape main body and the double-sided release tape are laminated together in such a manner that the adhesive layer of the biodegradable double-sided adhesive tape main body is in contact with the release agent layer of the double-sided release tape.

The biodegradable adhesive label according to the invention comprises a biodegradable adhesive label main body comprising an adhesive label substrate including a biodegradable polymer layer and an adhesive layer laminated on the adhesive label substrate, and a release sheet comprising a release sheet substrate including a layer formed from a material selected from a paper, a non-biodegradable polymer and a biodegradable polymer and a release agent layer formed on the release sheet substrate, wherein the biodegradable adhesive label main body and the release sheet are laminated together in such a manner that the adhesive layer of the biodegradable adhesive label main body is in contact with the release agent layer of the release sheet.

In the first adhesive tape, the second adhesive tape and the adhesive label according to the invention, each of the adhesive tape substrate and the adhesive label substrate may be made up of only the biodegradable polymer layer. Further, each of these substrates may be a laminate composed of the biodegradable polymer layer and a paper layer. Otherwise, it may be a laminate having the laminated structure: biodegradable polymer layer/paper layer/biodegradable polymer layer. Moreover, the adhesive tape substrate may be a laminate of a biodegradable polymer layer and any one of a metallic thin film and a metallic oxide thin film.

The release tape substrate used in the second adhesive tape of the invention may be made up of only a biodegradable polymer layer or only a paper layer. Otherwise, it may be a laminate having the laminated structure: biodegradable polymer layer/paper layer/biodegradable polymer layer.

In the adhesive label of the invention, the release sheet substrate may be made up of only a paper layer, only a non-biodegradable polymer layer or only a biodegradable polymer layer. This release sheet substrate may be a laminate of a paper layer and any one of a non-biodegradable polymer layer and a biodegradable polymer layer. Otherwise, it may be a laminate having the laminated structure: non-biodegradable polymer layer/paper layer/non-biodegradable polymer layer, or the laminated structure: biodegradable polymer layer/paper layer/biodegradable polymer layer.

DETAILED DESCRIPTION OF THE INVENTION

The biodegradable adhesive tape and the biodegradable adhesive label according to the invention will be described below in more detail with reference to their preferred embodiments.

The first biodegradable adhesive tape of the invention is now described with reference to FIGS. 1 to 4 of the attached drawings. FIGS. 1 to 4 are each an enlarged sectional view showing one preferred embodiment of the first biodegradable adhesive tape according to the invention.

Figure 1:
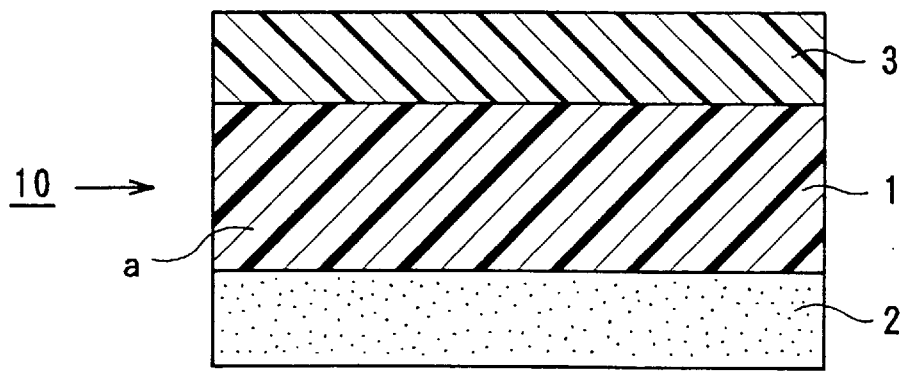
FIG. 1 is a schematic sectional view showing one preferred embodiment of the first biodegradable adhesive tape according to the present invention.

In the biodegradable adhesive tape 10 shown in FIG. 1, a release agent layer 3 is formed on one surface of an adhesive tape substrate 1 which is made up of only a biodegradable polymer layer (a), and an adhesive layer 2 is formed on the other surface of the adhesive tape substrate 1.

As a material of the biodegradable polymer layer (a), any biodegradable polymers may be used as far as they can be degraded by organism (microbes) existing in the natural world to be finally turned into such as carbon dioxide and water, that is, they have so-called biodegradability. Listed below are preferred examples of the biodegradable polymers used for forming the biodegradable polymer layer.

a) linear polyester of 3-hydroxybutyric acid and 3-hydroxyvaleric acid (trade name: Biopole, available from ICI Co., England);

This linear polyester (Biopole) is obtained by sugar fermentation by Alcaligenes Europhus.

b) lactic acid type biodegradable polymers prepared by ring-opening polymerization of lactide which is obtained by lactic acid fermentation of glucose (available from Shimazu Seisakusho Co.);

c) biodegradable polymers prepared from natural polymers such as starch, polysaccharides and chitin (e.g., Pulran (trade name) available from Rinbara Kenkyusho);

d) biodegradable polycaprolactone obtained by ring-opening polymerization of ε-caprolactam;

e) biodegradable polymers such as polyvinyl alcohol and denatured products thereof (trade name: Biotex, available from Air Product and Chemicals Co., U.S.A.);

f) biodegradable polymers such as polyether, polyacrylic acid, ethylene/carbon monoxide copolymer, aliphatic polyester/polyamide copolymer, aliphatic polyester/polyolefin copolymer, aliphatic polyester/aromatic polyester copolymer and aliphatic polyester/polyether copolymer;

g) biodegradable polymers such as polylactic acid, polybutyric acid, polyglycolide and derivatives thereof;

h) polymer alloy of starch and denatured polyvinyl alcohol (trade name: Matabee, available from Novamont Co., U.S.A.);

i) polymer alloy of starch and polyethylene (trade name: Polygrade II, available from Anpacette Co.; trade name: Polyclean, available from Arker Daniel Midland Co., U.S.A.);

j) composition of silane starch and polyethylene (trade name: Ecostar, available from St. Laurence Starch Co.); and k) polymer alloy of polycaprolactone and polyethylene (trade name: Biomicron, available from JSP Co.; trade name: Tone, available from Union Carbide Co., U.S.A.).

When the biodegradable adhesive tape 10 having a biodegradable polymer layer formed from the above-mentioned polymers is discarded in the soil, the biodegradable polymer layer (a) is degraded by microbes in the soil into such as carbon dioxide and water.

The thickness of the adhesive tape substrate 1 made up of only the biodegradable polymer layer (a) is in the range of usually 12 to 125 μm, preferably 25 to 100 μm.

Such adhesive tape substrate 1 can be prepared by subjecting the above-mentioned biodegradable polymer, e.g., a mixture of starch and denatured polyvinyl alcohol, to a film-forming process such as inflation or T-die casting. The resulting film is then subjected to stretching as a post treatment if necessary, so as to have a desired thickness.

Examples of the release agent for forming the release agent layer 3 include release agents of natural compounds such as shellac, natural wax, casein and starch, and synthetic release agents such as polyvinyl alcohol, derivatives thereof and silicone. They can be used singly or in combination.

Some of the release agents of natural compounds and some of the synthetic release agents such as polyvinyl alcohol and derivative thereof exhibit biodegradability.

In the present invention, the release agent layer 3 is preferably formed from the biodegradable release agents, because the natural environment is not disrupted even when the biodegradable adhesive tape 10 is discarded in the soil.

The thickness of the release agent layer 3 is in the range of usually 0.01 to 1 μm, preferably 0.03 to 0.1 μm.

The release agent layer 3 can be formed by coating the upper surface of the adhesive tape substrate 1 with the release agent as mentioned above by means of, for example, a roll coater.

The adhesive for forming the adhesive layer 2 in the biodegradable adhesive tape 10 is, for example, an adhesive made of a mixture of a natural rubber and at least one tackifier resin selected from the group consisting of rosin, derivatives of rosin (e.g., hydrogenated rosin, disproportionated rosin, polymerized rosin and rosin ester), terpene, and derivatives of terpene (e.g., α-pinene resin, β-pinene resin, dipentene resin and hydrogenation products of these resins). The natural rubber may be in the form of either a solid or a latex. In the adhesive, the tackifier resin is preferably used in an amount of 1 to 150 parts by weight based on 100 parts by weight of the natural rubber.

Since the above-mentioned adhesive exhibits biodegradability, it can be favorably used for forming the adhesive layer 2 in the invention.

The biodegradable adhesive tape 10 consisting of the adhesive tape substrate 1 exhibiting biodegradability, the release agent layer 3 exhibiting biodegradability and the adhesive layer 2 exhibiting biodegradability especially does not disrupt the natural environment even when it is discarded in the soil.

An acrylic type adhesive conventionally widely used is also employable as the adhesive. The acrylic type adhesive is ordinarily deteriorated and decomposed when it is discarded in the soil.

The amount of the adhesive for forming the adhesive layer 2 is in the range of usually 10 to 100 $g/m^2$, preferably 20 to 50 $g/m^2$.

The adhesive layer 2 can be obtained by, for example, coating the lower surface of the adhesive tape substrate 1 with a solution of the above-mentioned adhesive and drying the solution at a temperature of 50° to 120° C.

Examples of solvents used for preparing the coating solution of the adhesive include toluene, xylene and ethyl acetate.

Figure 2:
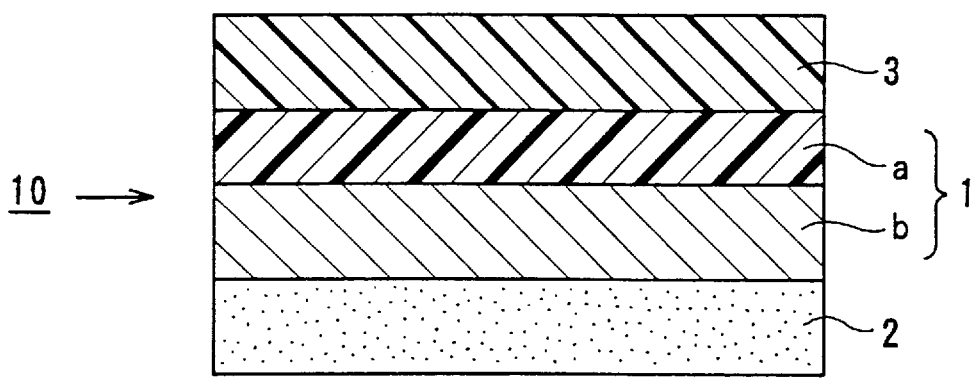
FIGS. 2 to 4 are each a schematic sectional view showing another preferred embodiment of the first biodegradable adhesive tape according to the present invention.

The biodegradable adhesive tape 10 shown in FIG. 2 is the same as the biodegradable adhesive tape 10 shown in FIG. 1 except for the adhesive tape substrate 1.

In the biodegradable adhesive tape 10 shown in FIG. 2, the adhesive tape substrate 1 is composed of a laminate of a biodegradable polymer layer (a) and a paper layer (b), and the paper layer (b) is provided between the biodegradable polymer layer (a) and the adhesive layer 2.

The polymer of the biodegradable polymer layer (a) and the thickness of the polymer layer are the same as those described above.

The thickness of the paper layer (b) is determined in such a manner that the weight of the paper layer (b) is in the range of usually 50 to 150 $g/m^2$, preferably 60 to 100 $g/m^2$.

The adhesive tape substrate 1 composed of the laminate of the biodegradable polymer layer (a) and the paper layer (b) can be obtained by, for example, laminating the biodegradable polymer layer (a) on the paper layer (b) at a temperature of 100° to 300° C. using an extrusion molding machine.

Figure 3:
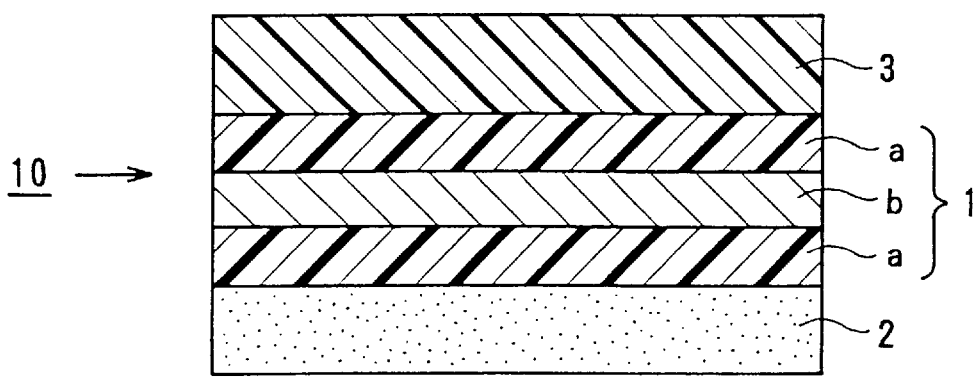

The biodegradable adhesive tape 10 shown in FIG. 3 is the same as the adhesive tape 10 shown in FIG. 1 except for the adhesive tape substrate 1. In the biodegradable adhesive tape 10 shown in FIG. 3, the adhesive tape substrate 1 is composed of a laminate having the laminated structure: biodegradable polymer layer (a)/paper layer (b)/biodegradable polymer layer (a).

The adhesive tape substrate 1 having such a three-layered structure as mentioned above can be obtained in the same manner as for the adhesive tape substrate 1 shown in FIG. 2, except that the biodegradable polymer layer (a), the paper layer (b) and the biodegradable polymer layer (a) are superposed one upon another in this order.

Figure 4:
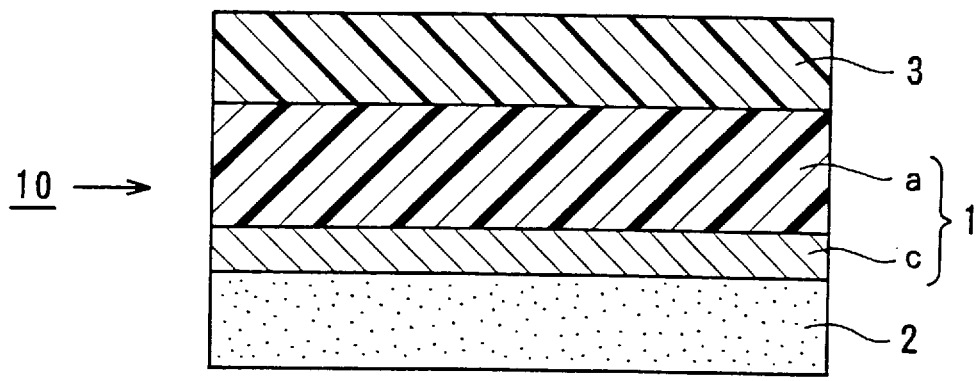

In the biodegradable adhesive tape 10 shown in FIG. 4, the adhesive tape substrate 1 is composed of a laminate of a biodegradable polymer layer (a) and a metallic thin film (c), and the metallic thin film (c) is provided between the biodegradable polymer layer (a) and the adhesive layer 2. In place of the metallic thin film (c), a metallic oxide thin film such as a silica thin film may be provided.

The biodegradable polymer layer (a) and the thickness thereof are the same as those described above.

As the metallic thin film (c), a thin film of aluminum, brass, chromium or the like can be used. The thickness of the metallic thin film (c) is in the range of usually 50 to 1,000 angstrom, preferably 100 to 300 angstrom.

The adhesive tape substrate 1 composed of the laminate of the biodegradable polymer layer (a) and the metallic thin film (c) can be obtained by, for example, forming the metallic thin film (c) such as an aluminum thin film on the biodegradable polymer layer a by means of vacuum deposition, sputtering, ion plating, etc. When the metallic thin film (c) is formed on the biodegradable polymer layer (a) by vacuum deposition, the degree of vacuum is adjusted to be in the range of $1\times10^{-4}$ to $1\times10^{-5}$ torr. The metallic thin film thus formed on the biodegradable polymer layer (a) generally has an oxygen permeability constant of $1\times10^{-12}$ to $1\times10^{-14}$ $cm^3$ (STP).$cm/cm^2$.sec.cmHg.

Each of the biodegradable adhesive tapes 10 shown in FIGS. 1 to 4 is a single-sided adhesive tape, and it is generally rolled up on the outer peripheral surface of a tubular core material (not shown) via the release agent layer so that the adhesive layers are not brought into contact with each other.

Next, the second biodegradable adhesive tape according to the invention is described with reference to FIGS. 5 to 16 of the attached drawings. FIGS. 5 to 16 are each an enlarged sectional view showing one preferred embodiment of the second biodegradable adhesive tape of the invention.

The biodegradable adhesive tape 10 is composed of a biodegradable double-sided adhesive tape main body 20 and a double-sided release tape 30.

In the biodegradable double-sided adhesive tape main body 20, an adhesive layer 2 is provided on each surface of the adhesive tape substrate 1 which is made up of only a biodegradable polymer layer (a).

The material of the biodegradable polymer layer (a), the thickness of the layer and the method for forming the layer are the same as those in the embodiment shown in FIG. 1.

On both surfaces of the adhesive tape substrate 1, the adhesive layer 2 is provided. The material of the adhesive layer 2 and the amount of the adhesive applied to the adhesive tape substrate 1 are the same as those in the embodiment shown in FIG. 1.

The adhesive layer 2 can be obtained by, for example, coating the upper and the lower surfaces of the adhesive tape substrate 1 in order with a solution of the above-mentioned adhesive in a solvent such as toluene, xylene or ethyl acetate, and then drying the solution at a temperature of 50° to 120° C.

The double-sided release tape 30 comprises a release tape substrate 4 and a release agent layer 3, and the release agent layer 3 is formed on each surface of the release tape substrate 4.

The release tape substrate 4 is formed from only the biodegradable polymer layer (a), similarly to the adhesive tape substrate 1.

The thickness of the release tape substrate 4 composed of only the biodegradable polymer layer (a) is the same as that of the adhesive tape substrate in the embodiment shown in FIG. 1.

The release tape substrate 4 composed of only the biodegradable polymer layer (a) does not disrupt the natural environment even if the double-sided release tape 30 is discarded in the soil.

The material of the release agent layer 3 and the thickness thereof are the same as those of the release agent layer formed on the adhesive tape substrate in the embodiment shown in FIG. 1.

Of the release agents of the natural compounds and the synthetic release agents as described above, those exhibiting biodegradability are preferably used, because the natural environment is not disrupted even if the double-sided release tape 30 is discarded in the soil.

The release agent layer 3 can be formed by coating the upper and lower surfaces of the release tape substrate 4 in order with the above-mentioned release agent by means of, for example, a roll coater.

In the biodegradable double-sided adhesive tape 10 consisting of the biodegradable double-sided adhesive tape main body 20 and the biodegradable double-sided release tape 30 as mentioned above, the biodegradable double-sided adhesive tape main body 20 and the double-sided release tape 30 are superposed one upon another in such a manner that the adhesive layer 2 provided on one surface of the former and the release agent layer 3 provided on one surface of the latter are brought into contact with each other.

Further, the biodegradable double-sided adhesive tape 10 is stored or on the market in the form of a roll which is made by winding the double-sided release tape 30 and the biodegradable double-sided adhesive tape main body 20 which are combined together around a core with the double-sided release tape 30 being outside.

Figure 5:
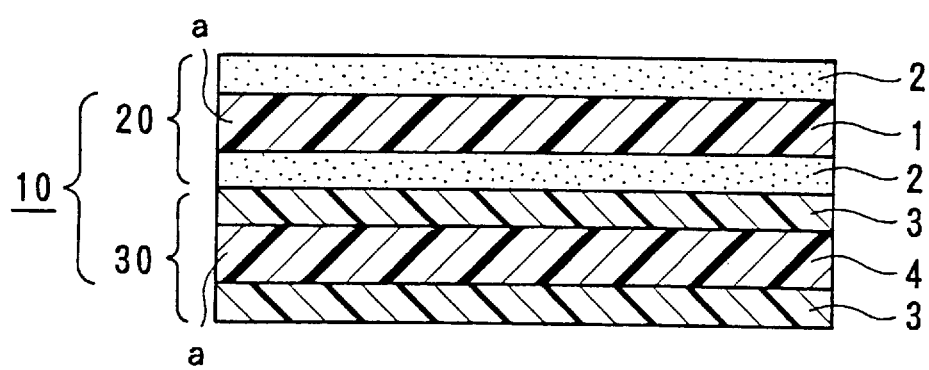
FIG. 5 is a schematic sectional view showing one preferred embodiment of the second biodegradable adhesive tape according to the present invention.
Figure 6:
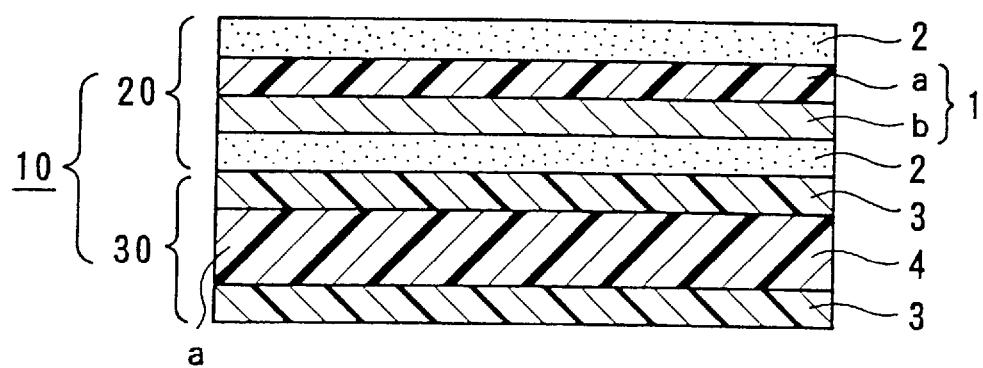
FIGS. 6 to 16 are each a schematic sectional view showing another preferred embodiment of the second biodegradable adhesive tape according to the present invention.

The biodegradable double-sided adhesive tape 10 shown in FIG. 6 is the same as the biodegradable adhesive tape 10 shown in FIG. 5 except for the adhesive tape substrate 1 of the biodegradable double-sided adhesive tape main body 20.

In the biodegradable double-sided adhesive tape main body 20 shown in FIG. 6, the adhesive tape substrate 1 is composed of a laminate of a biodegradable polymer layer (a) and a paper layer (b).

The material of the biodegradable polymer layer (a), the thickness of the layer, the method for forming the layer, the thickness of the paper layer (b) and the method for laminating the biodegradable polymer layer (a) on the paper layer (b) are the same as those in the embodiment shown in FIG. 2.

Figure 7:
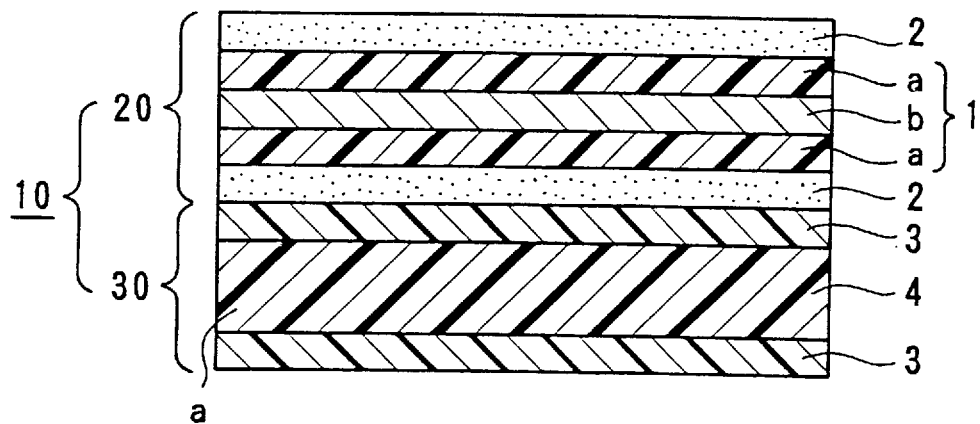

The biodegradable double-sided adhesive tape 10 shown in FIG. 7 is also the same as the double-sided adhesive tape 10 shown in FIG. 5 except for the adhesive tape substrate 1 of the biodegradable double-sided adhesive tape main body 20.

In the biodegradable double-sided adhesive tape main body 20 shown in FIG. 7, the adhesive tape substrate 1 is composed of a laminate having the laminated structure: biodegradable polymer layer (a)/paper layer (b)/biodegradable polymer layer (a).

The adhesive tape substrate 1 composed of such a laminate as mentioned above can be obtained in the same manner as for the adhesive tape substrate 1 shown in FIG. 6 except that the biodegradable polymer layer (a), the paper layer (b) and the biodegradable polymer layer (a) are superposed one upon another in this order.

Figure 8:
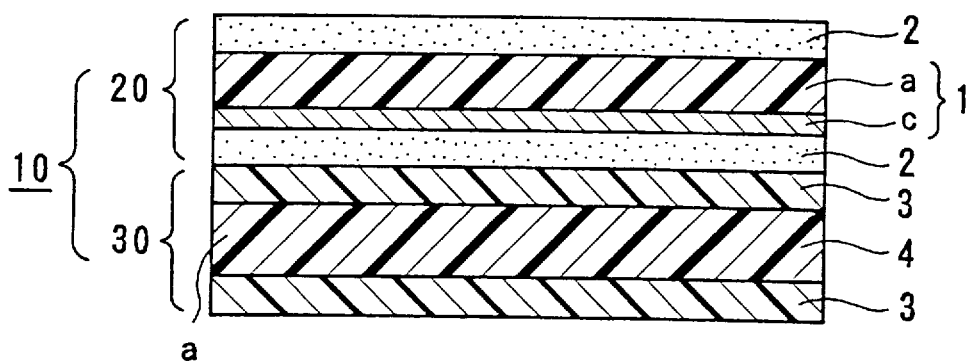

The biodegradable adhesive tape 10 shown in FIG. 8 is the same as the double-sided adhesive tape 10 shown in FIG. 5 except that the adhesive tape substrate 1 is composed of a laminate of a biodegradable polymer layer (a) and a metallic thin film (c) and that the metallic thin film (c) is provided between the biodegradable polymer layer (a) and the adhesive layer 2.

In the biodegradable adhesive tape of this invention, a metallic oxide thin film layer may be formed in place of the metallic thin film layer (c).

The material of the biodegradable polymer layer a and the thickness thereof are the same as those described above.

The material of the metallic thin film layer (c) (or the metallic oxide thin film layer), the thickness of the layer and the method for forming the layer are the same as those in the embodiment shown in FIG. 4.

Figure 9:
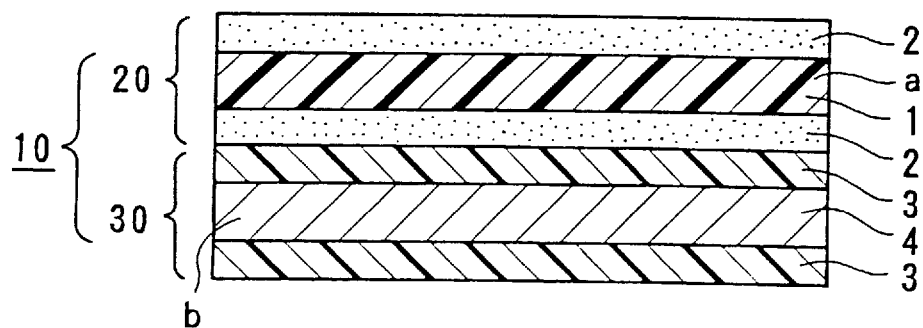

The biodegradable double-sided adhesive tape 10 shown in FIG. 9 is the same as the biodegradable adhesive tape 10 shown in FIG. 5 except for the release tape substrate 4 of the double-sided release tape 30.

In the biodegradable double-sided release tape 30 shown in FIG. 9, the release tape substrate 3 is made up of only a paper layer (b).

Figure 10:
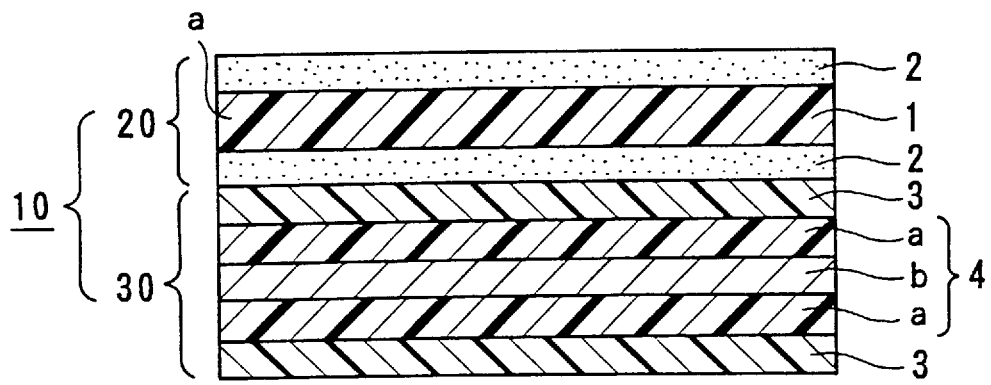

The biodegradable double-sided adhesive tape 10 shown in FIG. 10 is also the same as the biodegradable double-sided adhesive tape 10 shown in FIG. 5 except for the release tape substrate 4 of the double-sided release tape 30.

In the double-sided release tape 30 shown in FIG. 10, the release tape substrate 4 is composed of a laminate having the laminated structure: biodegradable polymer layer (a)/paper layer (b)/biodegradable polymer layer (a).

Figure 11:
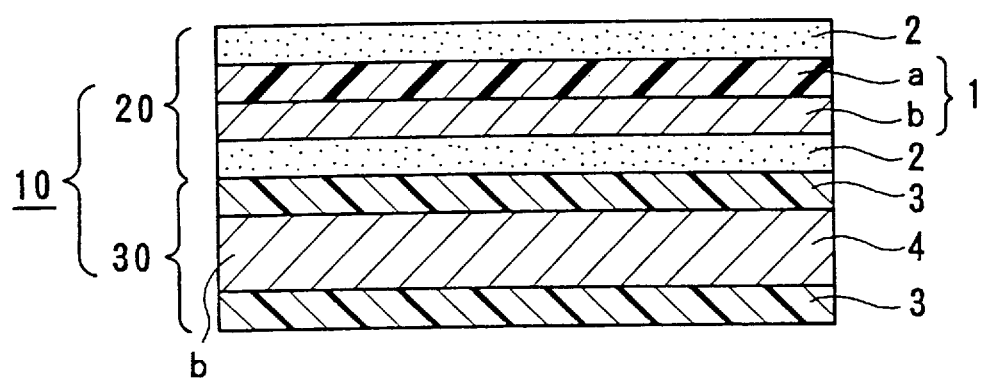
Figure 12:
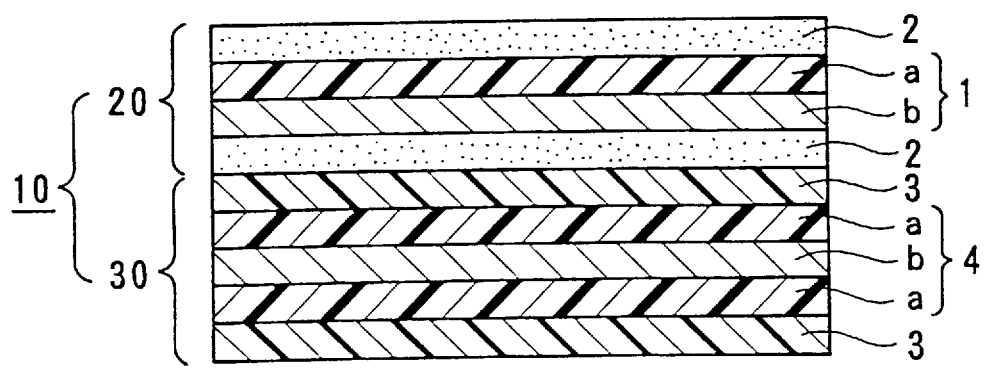
Figure 13:
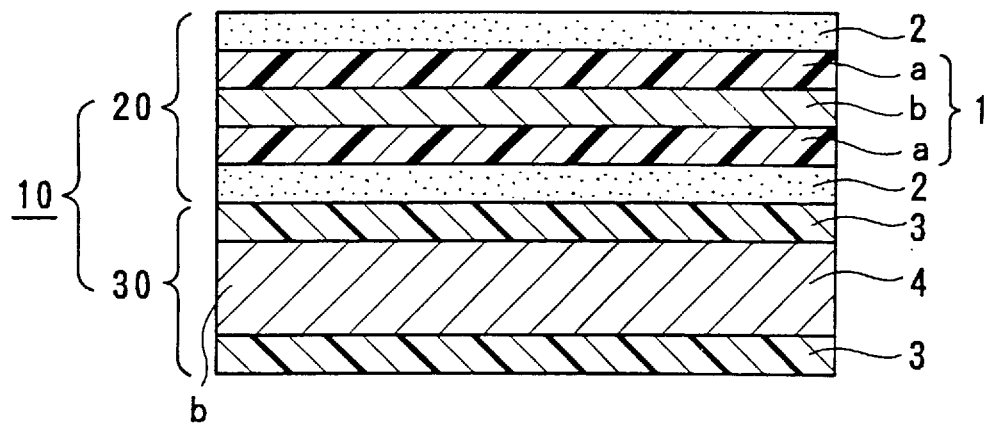
Figure 14:
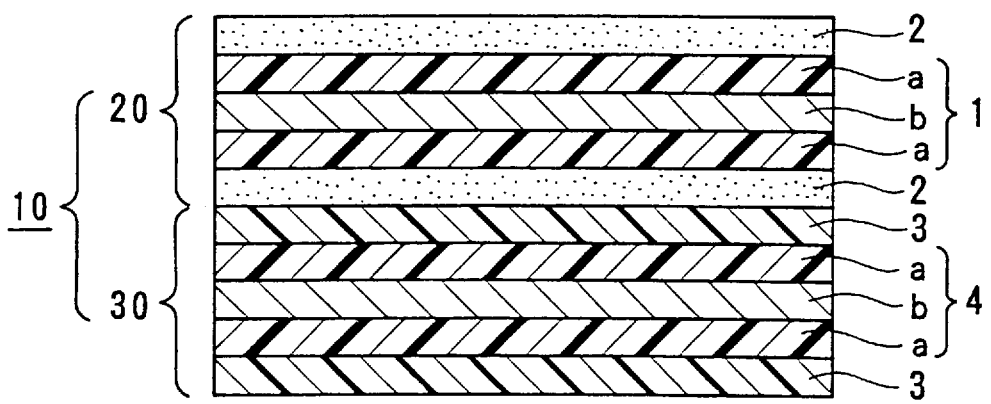
Figure 15:
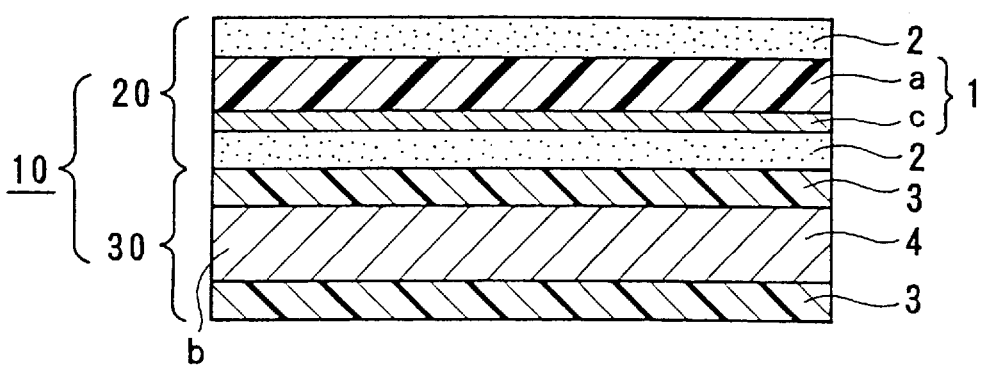
Figure 16:
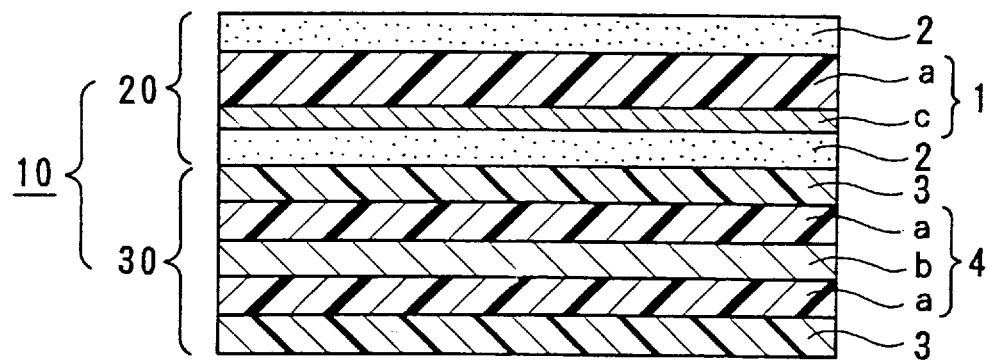

In the present invention, the following embodiments are also available other than the above-described ones.

i) a biodegradable double-sided adhesive tape 10, as illustrated in FIG. 11, which is constituted by bonding the adhesive layer 2 provided on one surface of the biodegradable double-sided adhesive tape main body 20 shown in FIG. 6 to the release agent layer 3 provided on one surface of the double-sided release tape 30 shown in FIG. 9;

ii) a biodegradable double-sided adhesive tape 10, as illustrated in FIG. 12, which is constituted by bonding the adhesive layer 2 provided on one surface of the biodegradable double-sided adhesive tape main body 20 shown in FIG. 6 to the release agent layer 3 provided on one surface of the double-sided release tape 30 shown in FIG. 10;

iii) a biodegradable double-sided adhesive tape 10, as illustrated in FIG. 13, which is constituted by bonding the adhesive layer 2 provided on one surface of the biodegradable double-sided adhesive tape main body 20 shown in FIG. 7 to the release agent layer 3 provided on one surface of the double-sided release tape 30 shown in FIG. 9;

iv) a biodegradable double-sided adhesive tape 10, as illustrated in FIG. 14, which is constituted by bonding the adhesive layer 2 provided on one surface of the biodegradable double-sided adhesive tape main body 20 shown in FIG. 7 to the release agent layer 3 provided on one surface of the double-sided release tape 30 shown in FIG. 10;

v) a biodegradable double-sided adhesive tape 10, as illustrated in FIG. 15, which is constituted by bonding the adhesive layer 2 provided on one surface of the biodegradable double-sided adhesive tape main body 20 shown in FIG. 8 to the release agent layer 3 provided on one surface of the double-sided release tape 30 shown in FIG. 9; and vi) a biodegradable double-sided adhesive tape 10, as illustrated in FIG. 16, which is constituted by bonding the adhesive layer 2 provided on one surface of the biodegradable double-sided adhesive tape main body 20 shown in FIG. 8 to the release agent layer 3 provided on one surface of the double-sided release tape 30 shown in FIG. 10.

Next, the biodegradable adhesive label according to the invention will be described with reference to FIGS. 17 to 29 of the attached drawings. FIGS. 17 to 20 are each an enlarged sectional view showing one preferred embodiment of the biodegradable adhesive label of the invention.

Figure 17:
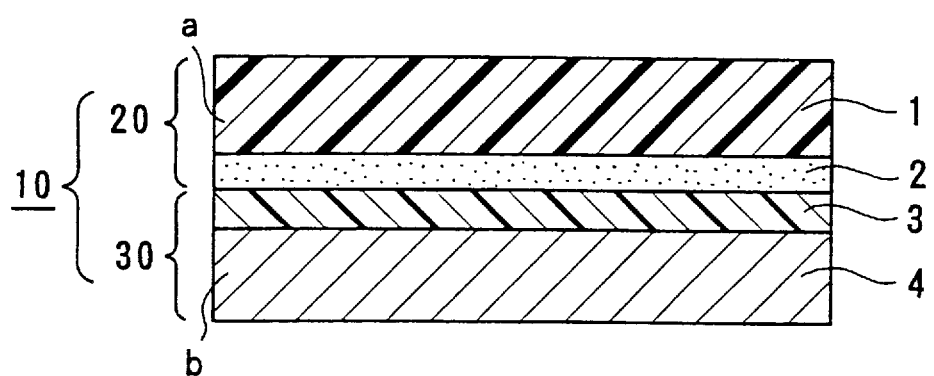
FIG. 17 is a schematic sectional view showing the biodegradable adhesive label according to the present invention.

The biodegradable adhesive label 10 shown in FIG. 17 is formed from a biodegradable adhesive label main body 20 and a release sheet 30.

In the biodegradable adhesive label main body 20, an adhesive layer 2 is laminated on one surface of an adhesive label substrate 1 composed of only a biodegradable polymer layer (a).

The material of the biodegradable polymer layer (a), the thickness of the layer and the method for forming the layer are the same as those for the adhesive tape substrate in the embodiment shown in FIG. 1.

On one surface of the adhesive label substrate 1, the adhesive layer 2 is formed. The material of this adhesive layer 2, the amount of the adhesive applied onto the substrate and the method for forming the layer are the same as those for the adhesive layer in the embodiment shown in FIG. 1.

The release sheet 30 consists of a release sheet substrate 4 and a release agent layer 3, and the release agent layer 3 is formed on one surface of the release sheet substrate 4.

In this embodiment, the release sheet substrate 4 is made up of only a paper layer.

With respect to the release agent layer 3 provided on such paper release sheet substrate 4, the material of the layer, the thickness thereof and the method for forming the layer are the same as those for the release agent layer in the embodiment shown in FIG. 5.

The biodegradable adhesive label of this embodiment is constituted by bonding the adhesive layer 2 of the biodegradable adhesive label main body 20 to the release agent layer 3 of the release sheet 30 described above.

Figure 18:
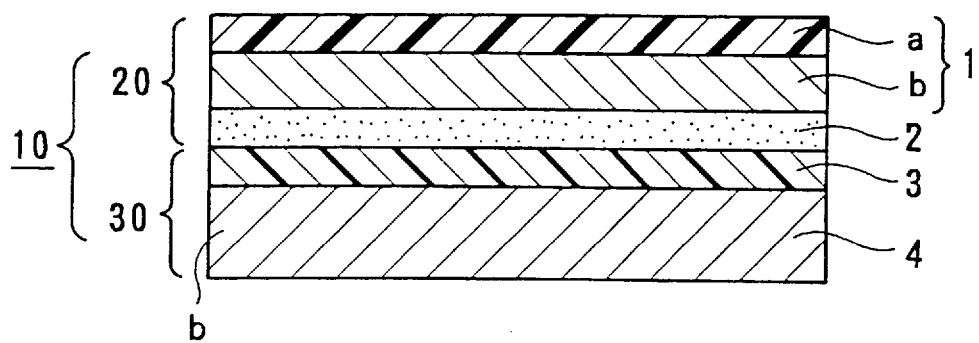
FIGS. 18 to 29 are each a schematic sectional view showing another preferred embodiment of the biodegradable adhesive label according to the present invention.

The adhesive label 10 shown in FIG. 18 is the same as the biodegradable adhesive label 10 shown in FIG. 17 except for the adhesive label substrate 1 of the biodegradable adhesive label main body 20.

In the biodegradable adhesive label main body 20 shown in FIG. 18, the adhesive label substrate 1 is composed of a laminate of a biodegradable polymer layer (a) and a paper layer (b).

The material of the biodegradable polymer layer (a), the thickness of the layer, the method for forming the layer, the thickness of the paper layer (b) and the method for laminating the biodegradable polymer layer (a) on the paper layer (b) are the same as those for the adhesive tape substrate in the embodiment shown in FIG. 2.

Figure 19:
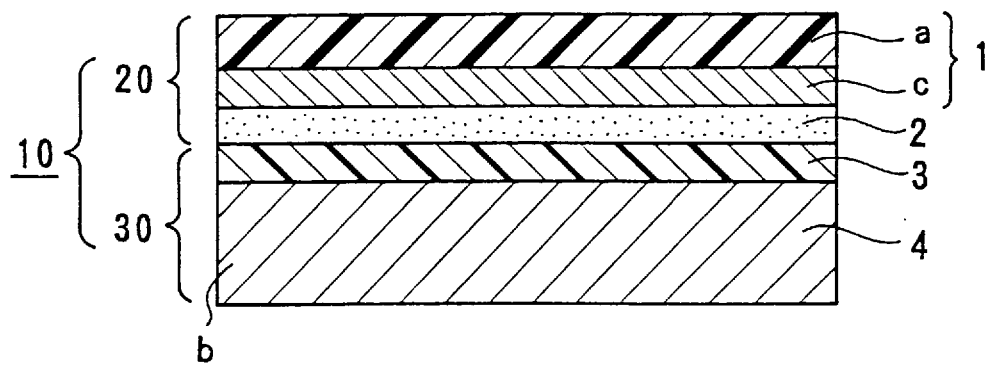

The biodegradable adhesive label 10 shown in FIG. 19 is also the same as the biodegradable adhesive label 10 shown in FIG. 17 except for the adhesive label substrate 1 of the biodegradable adhesive label main body 20.

In the biodegradable adhesive label main body 20 shown in FIG. 19, the adhesive label substrate 1 is composed of a laminate of a biodegradable polymer layer (a) and a metallic thin film (c). In place of the metallic thin film (c), a metallic oxide thin film such as a silica thin film may be provided.

The material of the biodegradable polymer layer (a) and the thickness thereof are the same as those described above.

Further, the material of the metallic thin film layer (c) (or the metallic oxide thin film layer), the thickness of the layer and the method for forming the layer are the same as those for the adhesive tape substrate in the embodiment shown in FIG. 4.

Figure 20:
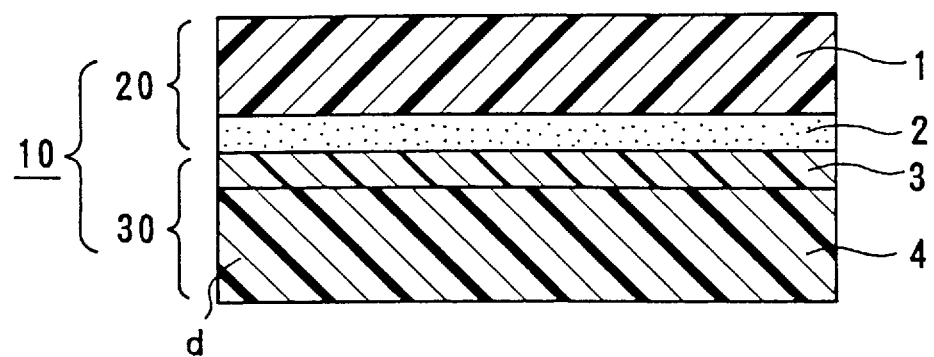

The adhesive label 10 shown in FIG. 20 is the same as the biodegradable adhesive label 10 shown in FIG. 17 except that the release sheet substrate 4 of the release sheet 30 is composed of a non-biodegradable polymer layer (d).

The non-biodegradable polymer layer (d) is formed from a conventionally known non-biodegradable polymer such as polyvinyl chloride, polyvinylidene fluoride or polyethylene, and the thickness of the layer (d) is the same as that of the above-mentioned biodegradable polymer layer (a).

The adhesive label of the invention is described above with respect to some embodiments in which the release sheet is composed of only the paper layer, only the non-biodegradable polymer layer or the laminate of the paper layer and the non-biodegradable polymer layer. However, the adhesive label of the invention may include other embodiments than those shown in FIGS. 17 to 20, so far as they do not deviate the scope of the patent claims of the invention. For example, in the adhesive label of the invention, the release sheet substrate of the release sheet may be formed from a laminate of a paper layer and a non-biodegradable polymer layer, or it may be formed from a laminate of a non-biodegradable polymer layer, a paper layer and a non-biodegradable polymer layer.

Further, in the adhesive label of the invention, the release sheet substrate may be composed of a biodegradable polymer layer, or it may be composed of a laminate of a paper layer and a biodegradable polymer layer. Some embodiments having these constitutions are described below.

FIGS. 21 to 29 are each an enlarged sectional view of a preferred embodiment of the biodegradable adhesive label according to the invention.

Figure 21:
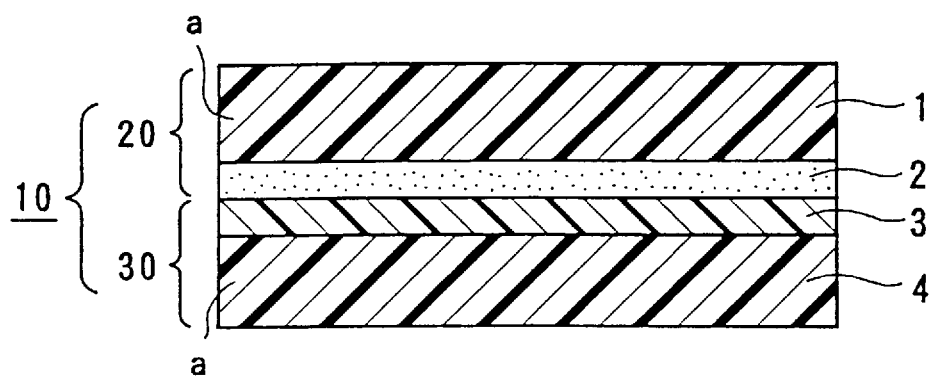

The biodegradable adhesive label 10 shown in FIG. 21 is formed from a biodegradable adhesive label main body 20 and a biodegradable release sheet 30.

The biodegradable adhesive label main body 20 is the same as the biodegradable label main body 20 shown in FIG. 17.

In the biodegradable release sheet 30, a release agent layer 3 is laminated on a release sheet substrate 4 which is composed of only a biodegradable polymer layer (a).

The material of the release sheet substrate 4 composed of only the biodegradable polymer layer (a), the thickness of the substrate and the method for forming the substrate are the same as those for the adhesive tape substrate in the embodiment shown in FIG. 1.

The release sheet substrate 4 composed of only the biodegradable polymer layer (a) does not disrupt the natural environment even if the biodegradable release sheet 30 is discarded in the soil, and therefore such release sheet substrate is preferably used for the invention.

The material of the release agent layer 3, the thickness of the layer and the method for forming the layer are the same as those for the release agent layer of the biodegradable adhesive label shown in FIG. 17.

In this embodiment, the release agent layer 3 formed from a release agent exhibiting biodegradability is particularly preferably used, because the natural environment is not disrupted even if the biodegradable release sheet 30 is discarded in the soil.

Figure 22:
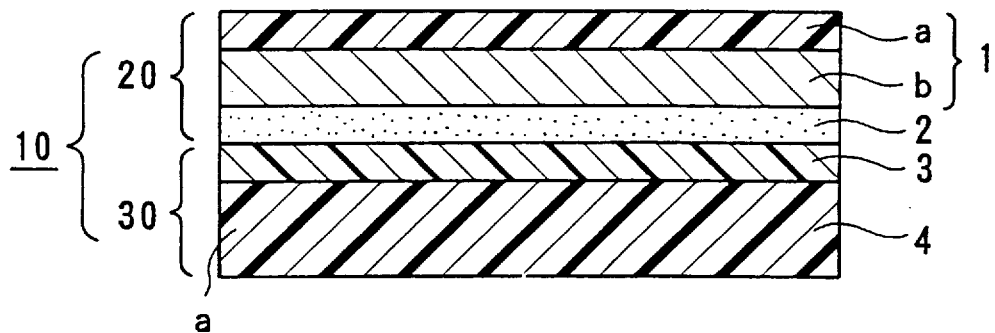

The biodegradable adhesive label 10 shown in FIG. 22 is the same as the embodiment shown in FIG. 21 except that the biodegradable adhesive label main body 20 is the same as that in the biodegradable adhesive label shown in FIG. 18.

Figure 23:
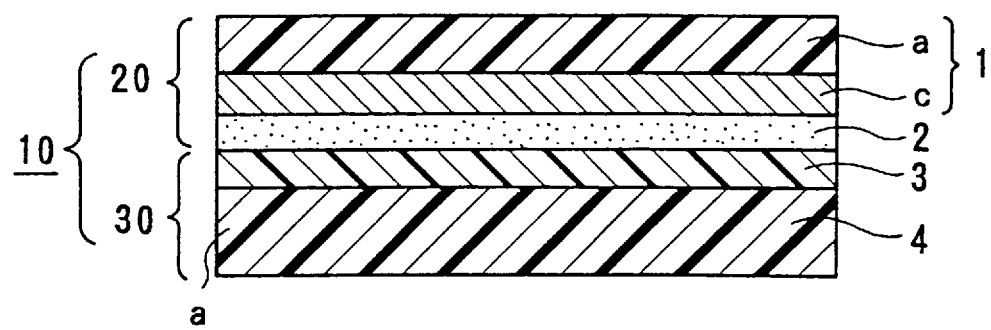

The biodegradable adhesive label 10 shown in FIG. 23 is the same as the embodiment shown in FIG. 21 except that the biodegradable adhesive label main body 20 is the same as that in the biodegradable adhesive label shown in FIG. 19.

Figure 24:
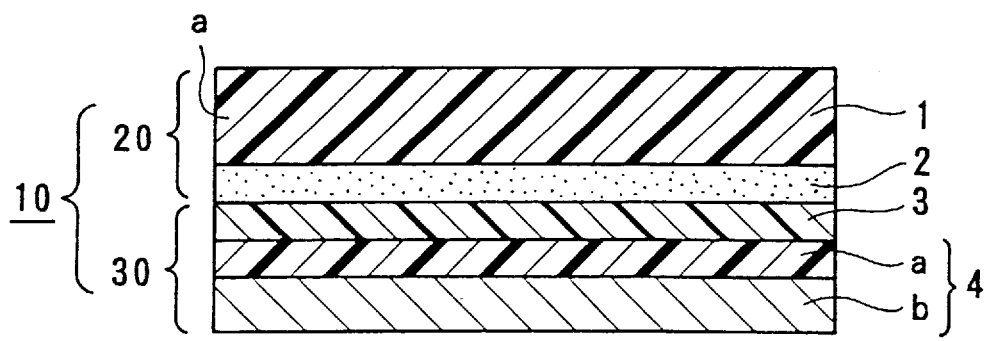

The biodegradable adhesive label 10 shown in FIG. 24 is the same as the biodegradable adhesive label shown 10 in FIG. 21 except for the release sheet substrate 4 of the biodegradable release sheet 30.

In the biodegradable release sheet 30 shown in FIG. 24, the release sheet substrate 4 is composed of a laminate of a biodegradable polymer layer (a) and a paper layer (b), and the release agent layer 3 is formed on the biodegradable polymer layer (a).

The material of the biodegradable polymer layer (a), the thickness of the layer and the method for forming the layer, the thickness of the paper layer (b) and the method for laminating the biodegradable polymer layer (a) on the paper layer (b) are the same as those for the biodegradable adhesive label main body 20 in the embodiment shown in FIG. 18.

Figure 25:
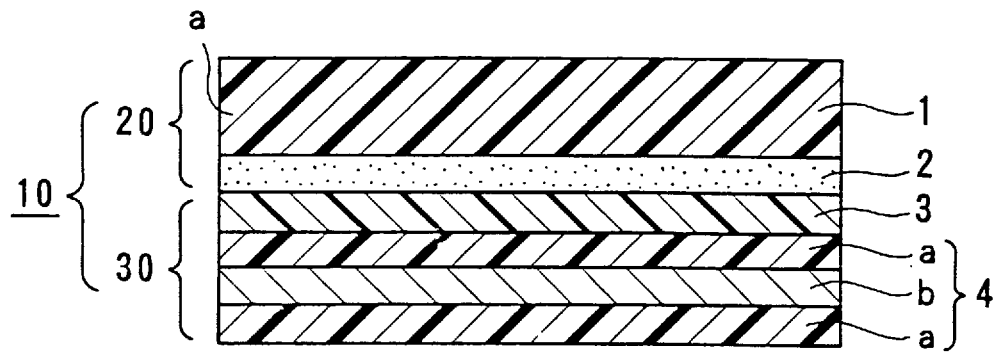

The biodegradable adhesive label 10 shown in FIG. 25 is also the same as the biodegradable adhesive label 10 shown in FIG. 21 except for the release sheet substrate 4 of the biodegradable release sheet 30.

In the biodegradable release sheet 30 shown in FIG. 25, the release sheet substrate 4 is composed of a laminate having the laminated structure: biodegradable polymer layer (a)/paper layer (b)/biodegradable polymer layer (a).

The release sheet substrate 4 having such a three-layer structure as mentioned above can be obtained in the same manner as for the release sheet substrate 4 in the embodiment shown in FIG. 10, that is, it can be obtained by superposing the biodegradable polymer layer (a), the paper layer (b) and the biodegradable polymer layer (a) one upon another in this order.

Figure 26:
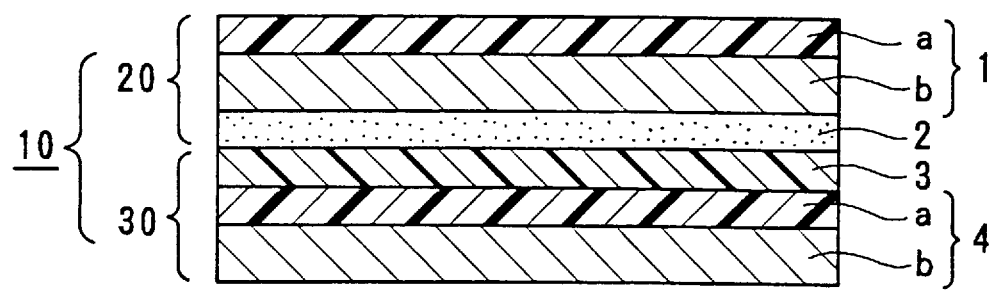
Figure 27:
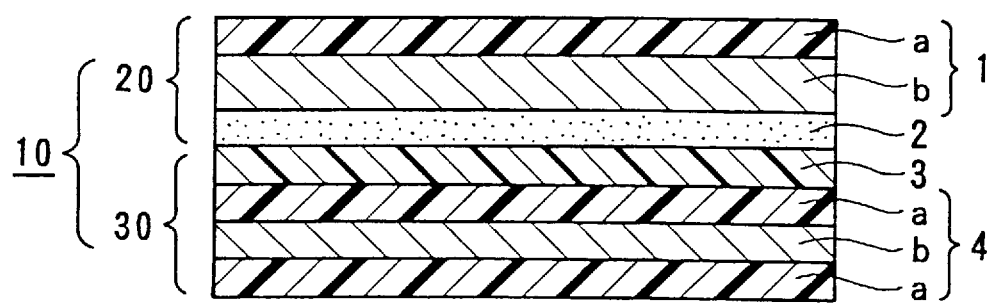
Figure 28:
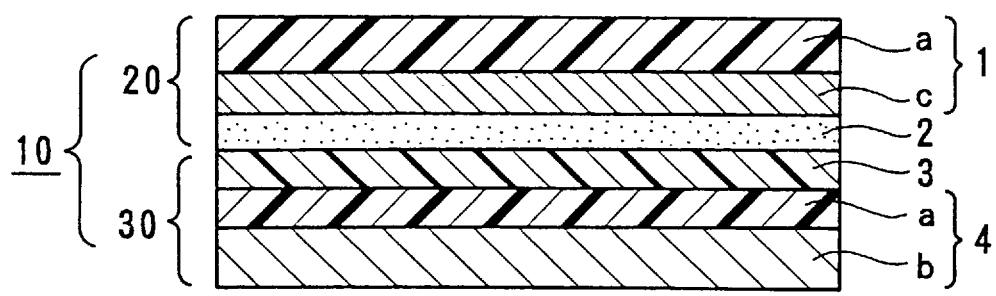
Figure 29:
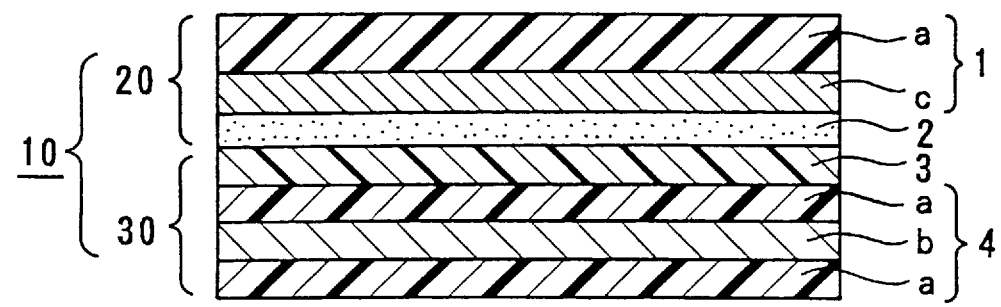

In the present invention, the following embodiments are also available other than the above-described ones.

i) a biodegradable adhesive label 10 illustrated in FIG. 26, which is constituted by bonding the adhesive layer 2 provided on one surface of the biodegradable adhesive label main body 20 shown in FIG. 22 to the release agent layer 3 provided on one surface of the biodegradable release sheet 30 shown in FIG. 24;

ii) a biodegradable adhesive label 10 illustrated in FIG. 27, which is constituted by bonding the adhesive layer 2 provided on one surface of the biodegradable adhesive label main body 20 shown in FIG. 22 to the release agent layer 3 provided on one surface of the biodegradable release sheet 30 shown in FIG. 25;

iii) a biodegradable adhesive label 10 illustrated in FIG. 28, which is constituted by bonding the adhesive layer 2 provided on one surface of the biodegradable adhesive label main body 20 shown in FIG. 23 to the release agent layer 3 provided on one surface of the biodegradable release sheet 30 shown in FIG. 24; and iv) a biodegradable adhesive label 10 illustrated in FIG. 29, which is constituted by bonding the adhesive layer 2 provided on one surface of the biodegradable adhesive label main body 20 shown in FIG. 23 to the release agent layer 3 provided on one surface of the biodegradable release sheet 30 shown in FIG. 25.

EFFECT OF THE INVENTION

According to the present invention, as described above, the natural environment is not disrupted or the ecosystem is not largely disorganized even if the adhesive tape and the adhesive label are discarded in the soil, because they use a biodegradable polymer as a material of their substrates.

EXAMPLE

The present invention is further described with reference to the following examples, but it should be construed that the invention is in no way limited to those examples.

EXAMPLE 1

One surface of a film made of a polymer alloy of starch and denatured polyvinyl alcohol (trade name: Matabee ZF03U, Novamont Co., U.S.A.) and having a thickness of 40 $\mu$m, which was a biodegradable polymer layer, was coated with shellac as a release agent to form a release agent layer having a thickness of 0.05 $\mu$m.

Then, the other surface of the biodegradable polymer layer was coated with a toluene solution containing a mixture of natural rubber and a terpene resin as an adhesive and having a concentration of 20% in an amount of 30 g/m$^2$ by means of a comma coater to form an adhesive layer. Thus, a biodegradable adhesive tape having a structure shown in FIG. 1 was obtained.

The biodegradable adhesive tape thus obtained was cut to have a width of 25 mm, and two of the resulting biodegradable adhesive tapes were bonded together in such a manner the adhesive layer of one tape was contacted with the release agent layer of the other tape. Then, those biodegradable adhesive tapes are peeled from each other under the conditions of a temperature of 23° C., a humidity of 65% RH, a peel rate of 300 mm/min and a peel angle of 180° to measure the peel strength.

Further, the biodegradable adhesive tape having a width of 25 mm was bonded to a surface of SUS304 (JIS: stainless steel) in such a manner that the adhesive layer of the adhesive tape was contacted with the surface of SUS304. Then, the biodegradable adhesive tape was peeled from the SUS304 under the same conditions as described above to measure the peel strength. From the peel strength, the adhesion strength of the biodegradable adhesive tape was evaluated.

The biodegradable adhesive tape obtained in the above was cut to give a sample having a size of 100 mm×100 mm. The sample was buried in the soil at the depth of 10 cm, allowed to stand for 1 month and 3 months, and dug up. The degree of degradation of the biodegradable adhesive tape was calculated by the following formula 1:

$$\text{Degree of degradation (\%)} = \frac{\text{Sample weight before burying} - \text{Sample weight after digging}}{\text{Sample weight before burying}} \times 100$$

COMPARATIVE EXAMPLE 1

An adhesive tape for comparison was prepared in the same manner as described in Example 1 except that a polypropylene film (trade name: Alphan SY101, available from Honshu Paper Mfg. Co., Ltd.) having the same thickness (40 $\mu$m) as that of the biodegradable polymer layer was used in place of the biodegradable polymer layer. The adhesive tape thus obtained was evaluated on the peel strength, the adhesion strength and the degree of degradation.

The results are set forth in Table 1.

TABLE 1

|  | Peel Strength (g/25 mm) | Adhesion Strength (g/25 mm) | Degree of Degradation (%) | |
|---|---|---|---|---|
|  |  |  | 1 month in the soil | 3 months in the soil |
| Example | 160 | 1,500 | 30 | 50 |
| Comp. Ex. 1 | 200 | 1,400 | 5 | 10 |

EXAMPLE 2

On both surfaces of a woodfree paper (available from LINTEC CORPORATION) having a basis weight of 80 g/m$^2$ was laminated a biodegradable polymer made of a polymer alloy of starch and denatured polyvinyl alcohol (trade name: Matabee ZF03U, Novamont Co., U.S.A.) at a heating temperature of 150° C. by means of an extrusion molding machine to form biodegradable polymer layers each having a thickness of 12 μm, whereby a release tape substrate consisting of a biodegradable polymer layer, a paper layer and a biodegradable polymer layer was obtained.

On each of the biodegradable polymer layers on both sides of the release tape substrate, a silicone release agent layer was formed using a silicon release agent (trade name: SRX244, available from Toray Silicone K.K.), to obtain a double-sided release tape.

Then, one surface of the above-mentioned biodegradable polymer film having a thickness of 40 μm, which was an adhesive tape substrate, was coated with a toluene solution containing a mixture of natural rubber and a terpene resin as an adhesive and having a concentration of 20% in an amount of 30 g/m$^2$ by means of a comma coater to form an adhesive layer.

The adhesive layer and the double-sided release tape were bonded together. Then, on the free surface of the adhesive tape substrate was formed the same adhesive layer as mentioned above to prepare a biodegradable double-sided adhesive tape having such a structure consisting of a biodegradable double-sided tape main body and a double sided release tape as shown in FIG. 10.

The biodegradable double-sided adhesive tape thus obtained was cut to have a width of 25 mm. Then, a polyester tape having a width of 25 mm was superposed on the adhesive layer of the biodegradable double-sided adhesive tape, and they are bonded to each other. Thereafter, the double-sided release tape was peeled from the biodegradable double-sided adhesive tape. The adhesive layer of the resulting laminate consisting of the double-sided adhesive tape main body and the polyester tape was bonded to the surface of SUS304, and the biodegradable adhesive tape was then peeled under the conditions of a temperature of 23° C., a humidity of 65% RH, a peel rate of 300 mm/min and a peel angle of 180° to measure the adhesion strength of the double-sided adhesive tape main body.

The biodegradable double-sided adhesive tape was cut to give a sample having a size of 100 mm×100 mm. The sample was buried in the soil at the depth of 10 cm, allowed to stand for 1 month and 3 months, and dug up. The degree of degradation of the biodegradable double-sided adhesive tape was calculated by the formula 1 of Example 1.

The results are set forth in Table 2.

COMPARATIVE EXAMPLE 2

A double-sided adhesive tape for comparison was prepared in the same manner as described in Example 2 except that a release tape substrate obtained by laminating polyethylene (trade name: Showflex L170, available from Showa Denko K.K.) with the same thickness as that of the biodegradable polymer layer in place of the biodegradable polymer on the woodfree paper at a heating temperature of 300° C. was used and that a polypropylene film (trade name: Alphan SY101, available from Honshu Paper Mfg. Co., Ltd.) with the same thickness as that of the adhesive tape substrate was used as the adhesive tape substrate. The double-sided adhesive tape thus obtained was evaluated on the adhesion strength and the degree of degradation.

The results are set forth in Table 2.

TABLE 2

|  | Adhesion Strength (g/25 mm) | Degree of Degradation (%) | |
|---|---|---|---|
|  |  | 1 month in the soil | 3 months in the soil |
| Example 2 | 1,900 | 30 | 50 |
| Comp. Ex. 2 | 1,800 | 10 | 25 |

EXAMPLE 3

On one surface of a film made from a copolymer of 3-hydroxybutyric acid and 3-hydroxysuccinic acid (trade name: Biopole, ICI Co., England) and having a thickness of 70 μm, which was a biodegradable polymer layer, aluminum was deposited at degree of vacuum of 5×10$^{-5}$ torr to form an aluminum thin film.

The aluminum thin film thus obtained was coated with a toluene solution containing a mixture of natural rubber and a terpene resin as an adhesive and having a concentration of 20% in an amount of 30 g/m$^2$ by means of a comma coater to form an adhesive layer, whereby a biodegradable adhesive label main body was obtained.

Then, on both surfaces of a woodfree paper (available from LINTEC CORPORATION) having a basis weight of 80 g/m$^2$, a polyethylene film (trade name: Showflex L170, Showa Denko K.K.) having a thickness of 12 μm was laminated at a heating temperature of 300° C. by means of an extrusion molding machine to obtain a release sheet substrate comprising a non-biodegradable polymer layer and a paper layer.

On the non-biodegradable polymer layer of the release sheet substrate, a release agent layer was formed using a silicone release agent (trade name: SRX244, available from Toray Silicone K.K.), to obtain a release sheet.

The adhesive layer of the biodegradable adhesive label main body was superposed on the release agent layer of the release sheet, and they were bonded together to obtain a biodegradable adhesive label.

The biodegradable adhesive label thus obtained was cut to have a width of 25 mm. Then, the biodegradable adhesive label main body was peeled from the release sheet, and the adhesive layer of the biodegradable adhesive label main body was bonded to the surface of SUS304. Thereafter, the adhesive label was peeled from the SUS304 under the conditions of a temperature of 23° C., a humidity of 65% RH, a peel rate of 300 mm/min and a peel angle of 180° to measure the peel strength. From the peel strength, the adhesion strength of the biodegradable adhesive label was evaluated.

The biodegradable adhesive label obtained in the above was cut to give a sample having a size of 100 mm×100 mm. The sample was buried in the soil at the depth of 10 cm, allowed to stand for 1 month and 3 months, and dug up. The degree of degradation of the biodegradable adhesive label was calculated by the formula 1 of Example 1.

The results are set forth in Table 3.

COMPARATIVE EXAMPLE 3

An adhesive label was prepared in the same manner as described in Example 3 except that a polyester film (trade name: Lumiler S-10, available from Toray Industries, Inc.) having a thickness of 75 μm was used as the adhesive label substrate. The adhesive label thus obtained was evaluated on the adhesion strength and the degree of degradation.

The results are set forth in table 3.

TABLE 3

|  | Adhesion Strength (g/25 mm) | Degree of Degradation (%) | |
| --- | --- | --- | --- |
|  |  | 1 month in the soil | 3 months in the soil |
| Example 3 | 1,900 | 40 | 60 |
| Comp. Ex. 3 | 1,800 | 20 | 25 |

EXAMPLE 4

On one surface of a film made from a copolymer of 3-hydroxybutyric acid and 3-hydroxysuccinic acid (trade name: Biopole, ICI Co., England) and having a thickness of 70 μm, which was a biodegradable polymer layer, aluminum was deposited at degree of vacuum of $5 \times 10^{-5}$ torr to form an aluminum thin film.

The aluminum thin film was coated with a toluene solution containing a mixture of natural rubber and a terpene resin as an adhesive and having a concentration of 20% in an amount of 30 g/m² by means of a comma coater to form an adhesive layer, whereby a biodegradable adhesive label main body was obtained.

Then, the biodegradable polymer layer was laminated on a woodfree paper (available from LINTEC CORPORATION) having a basis weight of 80 g/m² at a heating temperature of 200° C. by means of an extrusion molding machine to obtain a release sheet substrate comprising a biodegradable polymer layer and a paper layer.

On the biodegradable polymer layer of the release sheet substrate, a release agent layer was formed using a silicone release agent (trade name: SRX244, available from Toray Silicone K.K.), to obtain a biodegradable release sheet.

The adhesive layer of the biodegradable adhesive label main body was superposed on the release agent layer of the biodegradable release sheet, and they were bonded together to obtain a biodegradable adhesive label.

The biodegradable adhesive label thus obtained was cut to have a width of 25 mm. Then, the biodegradable adhesive label main body was peeled from the biodegradable release sheet, and the adhesive layer of the biodegradable adhesive label main body was bonded to the surface of SUS304. Thereafter, the adhesive label was peeled from the SUS304 under the conditions of a temperature of 23° C., a humidity of 65% RH, a peel rate of 300 mm/min and a peel angle of 180° to measure the peel strength. From the peel strength, the adhesion strength of the biodegradable adhesive label was evaluated.

The biodegradable adhesive label was cut to give a sample having a size of 100 mm×100 mm. The sample was buried in the soil at the depth of 10 cm, allowed to stand for 1 month and 3 months, and dug up. The degree of degradation of the biodegradable adhesive label was calculated by the formula 1 of Example 1.

The results are set forth in Table 4.

COMPARATIVE EXAMPLE 4

An adhesive label was prepared in the same manner as described in Example 4 except that a polyester film (trade name: Lumiler S-10, available from Toray Industries, Inc.) having a thickness of 75 μm was used as the adhesive label substrate and that a release sheet substrate obtained by laminating polyethylene (trade Name: Showflex L170, available from Showa Denko K.K.) on both surfaces of a woodfree paper (available from Rintec K.K.) having a basis weight of 80 g/m² at a heating temperature of 300° C. by means of an extrusion molding machine was used. The adhesive label thus obtained was evaluated on the adhesion strength and the degree of degradation.

The results are set forth in table 4.

TABLE 4

|  | Adhesion Strength (g/25 mm) | Degree of Degradation (%) | |
| --- | --- | --- | --- |
|  |  | 1 month in the soil | 3 months in the soil |
| Example 4 | 1,900 | 40 | 60 |
| Comp. Ex. 4 | 1,800 | 20 | 25 |

What is claimed is:

1. A biodegradable adhesive tape comprising:

an adhesive tape substrate which comprises a biodegradable polymer layer formed from at least one member selected from the group consisting of (i) a linear polyester of 3-hydroxybutyric acid and 3-hydroxyvaleric acid and (ii) a polymer alloy of starch and denatured polyvinyl alcohol;

a release agent layer formed on one surface of said substrate; and an adhesive layer formed on the other surface of said substrate, wherein said adhesive layer comprises a mixture of a natural rubber and at least one tackifier resin selected from the group consisting of rosin, derivatives of rosin, terpene and derivatives of terpene.

2. A biodegradable adhesive tape as claimed in claim 1, wherein said tackifier resin is terpene.

3. A biodegradable adhesive tape as claimed in claim 1, wherein said derivatives of terpene are selected from the group consisting of α-pinen resin, β-pinen resin and dipentene resin.

4. A biodegradable adhesive tape as claimed in claim 1, wherein said tackifier resin is rosin.

5. A biodegradable adhesive tape as claimed in claim 1, wherein said tackifier resin is rosin ester.

* * * * *